(12) United States Patent
Zhu et al.

(10) Patent No.: US 8,924,983 B2
(45) Date of Patent: Dec. 30, 2014

(54) METHOD AND DEVICE FOR PROCESSING INTER-SUBFRAME SERVICE LOAD BALANCING AND PROCESSING INTER-CELL INTERFERENCE

(75) Inventors: Zhiqiu Zhu, Beijing (CN); Nan Li, Beijing (CN); Qingquan Zeng, Beijing (CN); Mingyu Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 109 days.

(21) Appl. No.: 13/581,584

(22) PCT Filed: Mar. 21, 2011

(86) PCT No.: PCT/CN2011/071997
§ 371 (c)(1),
(2), (4) Date: Aug. 28, 2012

(87) PCT Pub. No.: WO2011/116674
PCT Pub. Date: Sep. 29, 2011

(65) Prior Publication Data
US 2012/0331478 A1    Dec. 27, 2012

(30) Foreign Application Priority Data
Mar. 24, 2010   (CN) .......................... 2010 1 0132237

(51) Int. Cl.
*H04W 28/08* (2009.01)
*H04W 72/04* (2009.01)

(52) U.S. Cl.
CPC .......... *H04W 72/0486* (2013.01); *H04W 28/08* (2013.01)
USPC ............................ 718/104; 718/105; 718/103

(58) Field of Classification Search
None
See application file for complete search history.

(56) References Cited

U.S. PATENT DOCUMENTS

2004/0042398 A1 * 3/2004 Peleg et al. ................... 370/230
2009/0252093 A1 * 10/2009 Frenger ........................ 370/329
(Continued)

FOREIGN PATENT DOCUMENTS

| CN | 101437265 | 5/2009 |
| CN | 101557276 | 10/2009 |

(Continued)

OTHER PUBLICATIONS

International Search Report for PCT/CN2011/071997 dated Jun. 30, 2011.

(Continued)

*Primary Examiner* — Hassan Phillips
*Assistant Examiner* — Ayanah George
(74) *Attorney, Agent, or Firm* — Foley & Lardner LLP; James F. Ewing; Paul M. H. Pua

(57) ABSTRACT

A method and device for processing inter-subframe service load balancing and processing inter-cell interference is disclosed. The method includes: when processing the inter-subframe service load balancing, determining a service load of a link in a time period; determining a resource utilization ratio threshold according to the service load; and transmitting service data in each subframe according to the utilization ratio threshold. When processing inter-cell interference, performing inter-subframe service load balancing and in combination with various inter-cell interference coordination technologies, performing an interference mitigation process in one or a combination of a frequency domain, power and a space domain by interference coordination technology.

20 Claims, 3 Drawing Sheets

(56) References Cited

U.S. PATENT DOCUMENTS

2010/0035645 A1* 2/2010 Chang et al. .................. 455/522
2011/0081865 A1* 4/2011 Xiao et al. .................... 455/63.1
2011/0211543 A1* 9/2011 Frederiksen et al. ......... 370/329

FOREIGN PATENT DOCUMENTS

| CN | 101557276 A | 10/2009 |
| CN | 101572946 A | 11/2009 |
| KR | 20090048354 A | 5/2009 |
| WO | WO 2004/004396 | 1/2004 |
| WO | WO-2010/020134 A1 | 2/2010 |

OTHER PUBLICATIONS

Qualcomm Incorporated, "eICIC Broadcast channel reliability"; 3GPP TSG-RAN WG4 57, Nov. 15-19, Jacksonville, USA.
Supplementary European Search Report dated Oct. 17, 2013 for EP Application No. 11758784.0.

* cited by examiner

METHOD AND DEVICE FOR PROCESSING INTER-SUBFRAME SERVICE LOAD BALANCING AND PROCESSING INTER-CELL INTERFERENCE

This application is a US National Stage of International Application No. PCT/CN2011/071997, filed on 21 Mar. 2011, designating the United States, and claiming priority from Chinese Patent Application No. 201010132237.7 filed with the Chinese Patent Office on Mar. 24, 2010 and entitled "Method and device for processing inter-subframe service load balancing and processing inter-cell interference", which is herein incorporated by reference in its entirety.

FIELD OF THE INVENTION

The present invention relates to the wireless communication technology and particularly to a method and device for processing inter-subframe service load balancing and processing inter-cell interference.

BACKGROUND OF THE INVENTION

In order to lower inter-cell interference and further improve the spectrum efficiency, the Fractional Frequency Reuse (FFR) technology has been introduced to the Worldwide Interoperability for Microwave Access (WiMAX) system, and an underlying idea thereof lies in transmission of data between adjacent cells in a fractional frequency reuse mode. FIG. 1 is a schematic principle diagram of FFR, and as illustrated in FIG. 1, an area denoted in a horizontal-line shape in the figure can be shared by three adjacent cells without any limitation on transmission power, so the area denoted in the horizontal-line shape is located in a frequency band with a frequency reuse coefficient of 1; and in the left diagram of FIG. 1, areas denoted in a mesh shape of the three cells are located respectively in different frequency bands, and the area denoted in the mesh shape of any cell will not be used by other cells, so the areas denoted in the mesh shape are located in frequency bands with a frequency reuse coefficient of 3; and other frequency bands in the right diagram than the frequency band where the area denoted in the horizontal-line shape is located have a reuse coefficient of 3/2.

In the Long Term Evolution (LTE) system, in order to achieve same-frequency networking as far as possible, the LTE standard decides the adoption of the Inter-Cell Interference Coordination (ICIC) technology and defines related load information, e.g., a High Interference Indicator (HII), an Overload Indicator (OI), a Relative-narrowband Tx Power indicator (RNTP), etc., to be exchanged via an X2 interface (an interface between eNodeBs) in the ICIC technology. In the ICIC technology, a decision on limiting the use of resources is made based upon load information generated in a current cell and received load information generated in an adjacent cell and is notified to a scheduler, a power controller and other modules to achieve the purpose of inter-cell interference coordination.

After receiving the decision on limiting the use of resources made by an ICIC module, the scheduler, the power controller and the other modules allocate frequency-domain resources and power resources for respective scheduled users in the current cell in compliance with the limitation to thereby coordinate/alleviate inter-cell interference.

As can be seen from the foregoing description, both the FFR technology and the ICIC technology are implemented by limiting the use of frequency resources and power resources of an adjacent cell, that is, the foregoing solutions only focus on frequency-domain and power resources, and take into account interference coordination over only these two dimensions.

Furthermore, in a beam shaping-enabled cell, inter-cell interference coordination/avoidance can be achieved in beam coordination solutions which can be divided into static beam coordination, dynamic beam coordination and scheduling and other solutions in accordance with beam coordination modes and beam coordination periods, but a general idea of beam coordination is to allocate mutually orthogonal time and frequency resources for users in the same beam direction in adjacent cells to thereby achieve the purpose of beam coordination, that is, alleviating interference. FIG. 2 is a schematic principle diagram of static beam coordination which illustrating a static beam coordination solution, and in FIG. 2, resources of an orthogonal frequency division multiplexing system are divided into four mutually orthogonal sets, and users in respective cells are also divided into four mutually orthogonal sets depending on direction information of the users, and then beam coordination is achieved by establishing a mapping relationship between the sets of users and the sets of resources, where the mapping relationship between the sets of users and the sets of resources satisfies the following condition:

Resources belonging to different sets of resources are allocated to the greatest extent for users belonging to the same set of directions in adjacent cells to thereby achieve the purpose of allocating mutually orthogonal resources for the users in the same direction in the adjacent cells. In FIG. 2, direction information of users in areas numbered 1 and 2 belongs to the same set of users, and space-domain beam coordination to avoid same-frequency interference can be achieved by allocating a resource in a set of resources 1 for the users in the area numbered 1 and allocating a resource in a set of resources 2 for the users in the area numbered 2.

A drawback of the prior art lies in that in the foregoing various interference alleviation solutions of the orthogonal frequency division multiplexing system, either coordination over frequency-domain, power, frequency and power resources alone or space-domain beam coordination alone is taken into account, but these methods generally do not take into account specific characteristics of the Time Division Duplex (TDD) system and thus also do not take into account the specific characteristics of TDD in combination with the foregoing solutions to achieve a solution to joint interference alleviation in a plurality of resource dimensions.

SUMMARY OF THE INVENTION

A technical problem to be addressed by the invention is to provide a method and device for processing inter-subframe service load balancing and processing inter-cell interference.

An embodiment of the invention provides a method for processing inter-subframe service load balancing, which includes the steps of:

determining a service load of a link over a period of time;
determining a threshold of resource utilization ratio according to the service load; and
transmitting service data in respective subframes according to the threshold of resource utilization ratio.

An embodiment of the invention provides a method for processing inter-cell interference, which includes the steps of:

performing an inter-subframe service load balancing process; and performing an interference alleviation process in one or a combination of the frequency domain, power and the space domain in combination with various inter-cell interference coordination technologies.

An embodiment of the invention provides a device for processing inter-subframe service load balancing, which includes:

a service load determining module configured to determine a service load of a link over a period of time;

a threshold determining module configured to determine a threshold of resource utilization ratio according to the service load; and a transmitting module configured to transmit service data in respective subframes according to the threshold of resource utilization ratio.

An embodiment of the invention provides a device for processing inter-cell interference, which includes:

an inter-subframe load balancing module configured to perform an inter-subframe service load balancing process; and an inter-cell interference coordination module configured to perform an interference alleviation process in one or a combination of the frequency domain, power and the space domain in combination with various inter-cell interference coordination technologies.

The advantageous effects of the invention are as follows:

When the inter-subframe service load balancing process provided in the embodiment of the invention is performed, firstly a service load of a link over a period of time is determined; and then a threshold of resource utilization ratio is determined according to the service load; and service data is transmitted in respective subframes according to the threshold of resource utilization ratio. Since service data is transmitted in respective subframes according to the threshold of resource utilization ratio, the drawback that a service load fluctuates with subframes in the TDD system can be addressed.

When the inter-cell interference process provided in the embodiment of the invention is performed, an inter-subframe service load balancing process is performed in combination with various inter-cell interference coordination technologies by which an interference alleviation process in one of the frequency domain, power and the space domain or a combination thereof is performed. Since the drawback that a service load fluctuates with subframes in the TDD system is addressed by an inter-subframe load balancing algorithm, time-domain balance of an interference level is achieved, and then interference coordination and alleviation in the frequency domain, power and even the space domain can further be achieved in combination with various interference coordination solutions.

As can be seen, the technical solutions according to the embodiments of the invention can alleviate a phenomenon that a poor interference alleviation effect may result from load information being not well adapted to a dynamic variation of the service load across respective subframes in the TDD system, and can further alleviate inter-cell interference in the LTE system and improve the overall throughput performance of the system and the service quality for users in the system.

DETAILED DESCRIPTION OF THE EMBODIMENTS

Figure 1:
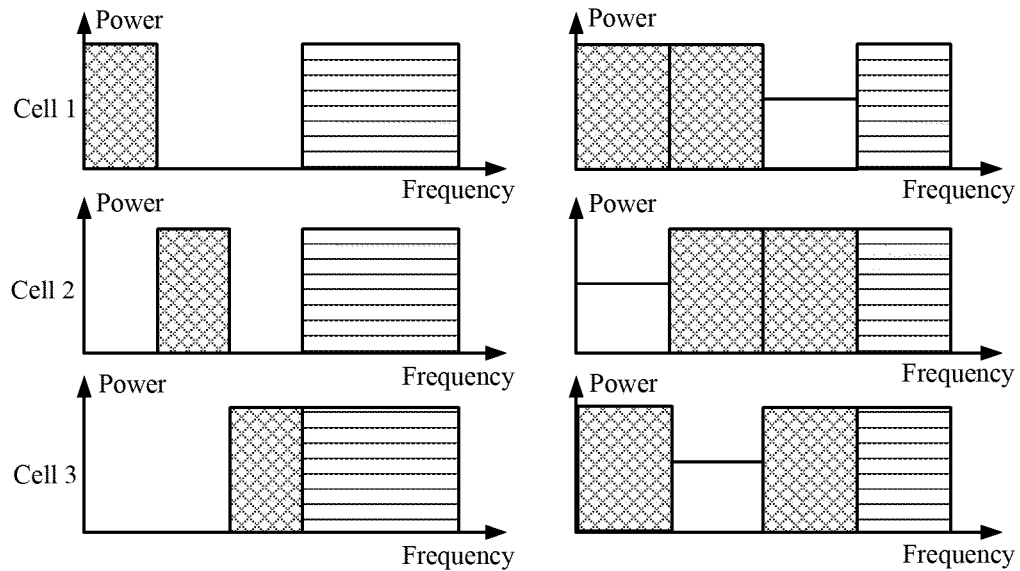
FIG. 1 is a schematic principle diagram of FFR in the prior art.

In the process of making the invention, the inventors have noticed that:

In a mobile communication system using the Orthogonal Frequency Division Multiplexing (OFDM) transmission technology, e.g., the LTE system, the WiMAX system, respective sub-carriers in cells are orthogonal to each other, so the problem of intra-cell interference has been well addressed. Thus for the orthogonal frequency division multiplexing system, respective cells are subject to interference primarily including two parts: intra-cell thermal noise and Inter-Cell Interference (ICI). Traditional communication technologies and signal processing technologies (e.g., match filtering) have well removed an adverse effect arising from thermal noise. For inter-cell interference, a typical cellular mobile communication system achieves the purpose of alleviating inter-cell interference in a frequency reuse (that is, resources of different frequency bands are used in adjacent cells) method, but this results directly in a drawback that a utilization ratio of frequency resources is low in the system.

An existing mobile communication system (e.g., the LTE system) makes a high demand for the spectrum efficiency of the system and desires a frequency reuse coefficient close to 1 as possible (that is, totally the same frequency-domain resource is used in adjacent cells), and in order to lower interference between the cells while considering the amount of information exchanged between the cells, a delay of interaction via an interface and other limiting factors, various OFDM systems generally adopt corresponding inter-cell interference alleviation solutions, for examples, the WiMAX system adopts the FFR solution, and the LTE system finally adopts the semi-static ICIC technology for the purpose of alleviating inter-cell interference and standardizes load information exchanged between cells.

In the LTE system, load information of respective cells can be exchanged via an X2 interface for the purpose of inter-cell frequency-domain interference coordination and power interference coordination. In the existing LTE standard, the Frequency Division Duplex (FDD) system and the Time Division Duplex (TDD) system adopt the same ICIC solution, and also the standard defines totally the same load information.

For the time division duplex-orthogonal frequency division multiplexing system, uplink and downlink communication links can not coexist due to the use of the same frequency for the uplink and downlink communication links. However, the arrivals of uplink and downlink service are not limited by respective subframe communication link directions, and specifically downlink data of respective users transmitted from a core network may arrive even in an uplink subframe; and a service demand of a User Equipment (UE) for uplink transmission may arrive even in a downlink subframe. Therefore particularly for the TDD system, a phenomena of accumulated downlink service will necessarily arise during uplink transmission, and after an uplink subframe comes to an end, such a situation tends to arise that an immediately following adjacent downlink subframe is heavily loaded instantaneously, and for a plurality of consecutive downlink subframes, the service load is distributed extremely unevenly across the respective downlink subframes: assuming that there are consecutive downlink subframes N, N+1 and N+2, and then such a situation tends to arise that the downlink subframe N is heavily loaded and the downlink subframe N+2 is lightly loaded. Furthermore, since respective cells in the time division duplex LTE system are synchronous and have generally consistent uplink and downlink subframe configuration, service loads of a plurality of cells for same-frequency networking will fluctuate consistently with respective subframes, and thus such a situation tends to arise that a load level of the system fluctuates sharply. This inter-subframe uneven distribution of a service load level will cause an inter-cell interference level in the system to fluctuate sharply with a varying service load: when there is a light service load, a data transmission demand of current service can be satisfied in each cell using only a small number of resources, and at this time inter-cell interference coordination/avoidance can be well achieved by the ICIC technology; and when there is a heavy service load, respective data transmission demands have be accommodated in respective cells using a large number of resources, and at this time a good interference coordination effect can not be achieved even with the ICIC technology defined in the standard, so inter-cell interference at this time will still be maintained at a high level. When there is a lot of Guaranteed Bit Rate (GBR) service, e.g., video streams, in the system, this feature of a system load level fluctuating sharply with subframes will become more prominent.

Furthermore, in view of a limited capacity and transmission delay of an X2 interface, load information defined in the standard can not be exchanged too frequently, so respective load information can be generated only based upon an average load level and interference level of cells over a period of time; and since the load information is obtained by smoothing a service load over a period of time, resource allocation restriction and adjustment information imposed on a scheduler in ICIC will also apply to be averaged to a service load level of each subframe instead of the service load level fluctuating with respective subframes in the TDD system. Interference alleviation of the TDD system is achieved depending on an inter-cell interference coordination strategy obtained from such statistically even service load information, thus inevitably restricting the performance of ICIC and making it very difficult to achieve the purpose of lowering inter-cell interference and optimizing the overall performance of the system.

A specific analysis will be made below.

For the static or semi-static FFR technology and Soft Frequency Reuse (SFR) in the WiMAX system and the static/semi-static ICIC technology of the LTE system, an interference coordination strategy is determined in all of these technologies by pre-configuring or making a statistic of service load levels of respective groups of users in cells over a period of time.

In the LTE system, since no network entity for centralized control exists at the side of an access network, the foregoing methods rely upon an exchange of related load information via an X2 interface (an interface between base stations), and in view of a limited capacity and a certain exchange delay of the X2 interface, thus load information exchanged between respective cells is very limited and updated at a long period in such methods. ICIC related load information and the shortest update periods thereof defined in the LTE standard are as follows: HII (20 ms), OI (200 ms) and RNTP (200 ms), and as can be seen, the period of the foregoing exchange of load information via the X2 interface is far larger than a scheduling interval of the system (the scheduling interval of the LTE system is 1 ms).

However, in the TDD system, since uplink and downlink subframes can not coexist and the arrivals of service in respective directions is independent from the direction of the current subframe, such a situation that downlink data is accumulated in uplink subframes inevitably arises, and taking the uplink and downlink subframe configuration 3 of the LTE TDD system as an example, data is still transmitted from the core network to base stations in uplink subframes 2, 3 and 4, so after the subframe 4 comes to an end, there is a lot of downlink data to be transmitted, and thus a subframe 5 is heavily loaded; and as consecutive downlink subframes arrive, the downlink data accumulated in the uplink subframes is gradually transmitted, and thus loads of subframes 6, 7, 8 and 9 will be gradually lowered. Since cells in the TDD system are synchronous, the foregoing phenomenon will arise in all the cells, resulting in a very high service load of the subframe 5 throughout the system and thus very high same-frequency interference, where same-frequency interference fluctuates sharply in the downlink subframes 5-9 in the system.

TABLE 1

| Uplink-downlink configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | uplink and downlink subframe configuration supported in LTE TDD system

In the table, D is a downlink subframe, U is an uplink subframe, and S is a special subframe.

Since a general idea of the foregoing FFR, static/semi-static ICIC and beam coordination solutions is to avoid to the greatest extent allocating mutually orthogonal resources for users possibly causing strong interference instead of actively removing interference by the means such as signal processing and the like, the method can play a good role when the load of the system is not too heavy, but when there is a very high service load level of the system, orthogonal resources can not be achieved at this time, and such a situation that same-frequency resources be used by interference-sensitive users in adjacent cells will inevitably arise, thus inevitably resulting in great same-frequency interference. Therefore in the example above, for the subframe 9, in the case that an average load of the system is not too heavy, the service loads of these subframes are very light, and a perfect interference alleviation effect will necessarily be achieved in the existing inter-cell interference coordination solutions; and for instantaneously heavily loaded subframes, e.g., the subframe 5, inter-cell interference can not be lowered effectively even if inter-cell interference coordination is performed in the FFR, static/semi-static ICIC, beam coordination and other solutions, so the performance of these subframes will be degraded dramatically.

Furthermore, an interference alleviation scheduling strategy generally is generated based upon an average load level over a period of time in the FFR, static/semi-static ICIC, beam coordination and other solutions in view of the amount of exchanged information and the complexity of algorithmic calculation, that is, in the strategy, an interference alleviation rule is generated by taking into account an average load level of all the subframes in the same direction over each link over a period of time, and this average load-based interference alleviation rule is applied to respective subframes in the same direction with sharply different loads in the TDD system, thus inevitably failing to achieve a good interference alleviation effect.

In view of the foregoing two aspects, the existing FFR, static/semi-static ICIC, beam coordination and other solutions can not play a good role and fail to achieve an optimized interference alleviation effect because the difference between loads of subframes in the TDD system is not considered.

In view of the foregoing analysis, in embodiments of the invention, an optimized solution to inter-cell interference alleviation will be provided for the foregoing characteristics of the time division duplex system, that is, uniform distribution of a system service load across respective subframes in the same direction, that is, time-domain balance of interference, is achieved in an inter-subframe load balancing algorithm; then interference coordination/avoidance of different frequency-domain resources in the orthogonal frequency division multiplexing system is achieved in combination with the Inter-Cell Interference Coordination (ICIC) technology for the purpose of frequency-domain and power coordination; and if beam shaping is supported in the system, then space-domain coordination can further be achieved in combination with directivity of the beam shaping technology. Thus the characteristics of the time division duplex system are fully considered, and joint interference alleviation is achieved from the perspective of the use of resources in a plurality of dimensions, e.g., time domain, frequency domain, even space domain, power, etc. Thus a further optimized interference alleviation effect can be achieved, the throughput of the system and the performance of edge users can be further improved and the Quality of Service (QoS) of users can be better guaranteed as compared with a general interference alleviation solution.

Embodiments of the invention will be described below with reference to the drawings.

Firstly in view of the foregoing analysis, the instantaneous service load level in the TDD system has sharply different distribution across different subframes, so only a very limited interference alleviation effect can be achieved by the interference coordination technology in some subframes. Furthermore, interference coordination solutions, such as the FFR, static/semi-static ICIC and the like, generally are performed by making an interference alleviation decision based upon an average service load level of each subframe over a period of time, so the accuracy of the interference alleviation strategy in the respective subframes will inevitably be influenced by using statically averaged load information over a period of time to reflect instantaneously sharply different service load levels of the respective subframes, thus also resulting in a poor interference alleviation effect. Thus firstly a method for processing inter-subframe service load balancing is proposed in an embodiment of the invention, and in this solution service loads in the same link direction can be evenly allocated to respective subframes in an inter-subframe load balancing algorithm so as to address the problem of sharply different distribution of the instantaneous service load levels across different subframes in the TDD system.

Figure 3:
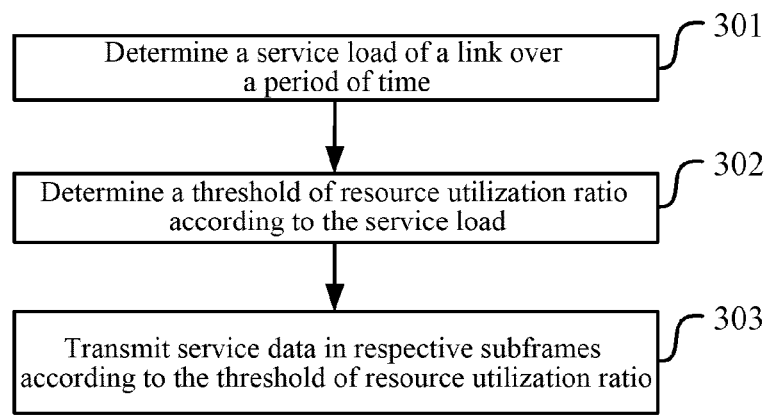
FIG. 3 is a schematic flow chart of performing a method for processing inter-subframe service load balancing according to an embodiment of the invention.

FIG. 3 is a schematic flow chart of performing a method for processing inter-subframe service load balancing, and as illustrated, service load balancing can be processed in the following steps:

The step 301 is to determine a service load of a link over a period of time;

The step 302 is to determine a threshold of resource utilization ratio according to the service load; and The step 303 is to transmit service data in respective subframes according to the threshold of resource utilization ratio.

In an implementation, the foregoing solution can alone address inter-subframe load balancing in the TDD system without necessarily being combined with interference coordination but can achieve a better interference alleviation effect in combination with interference coordination.

When the service loads in the same link direction is distributed evenly to respective subframes in an inter-subframe load balancing algorithm in the foregoing solution, this can be performed respectively depending on the past service loads and the future service loads, particularly in the following modes.

Mode 1

When the service load of the link over the period of time, i.e., the amount of data transmitted on the link over the period of time, is determined, the amount of data transmitted in all the subframes in the same link direction over a past period of time can be determined; and When the threshold of resource utilization ratio is determined according to the service load, i.e., the amount of data, the threshold of resource utilization ratio can be determined according to an average usage condition of resources in each subframe over the period of time.

In an implementation, a statistic of resource usage conditions of all the subframes in the same link direction over a period of time can be made, and a current threshold of resource utilization ratio can be determined according to the average resource usage condition, and when scheduled resources are allocated, the resources actually used by each subframe will not exceed the threshold of resource utilization ratio. In this mode, the amount of transmitted data, i.e., the number of transmitted bits, will not be considered, but only the number of used resources, i.e., the number of used PRBs, will be considered for the purpose of this mode.

Mode 2

When the service load of the link over the period of time, i.e., the amount of data transmitted on the link over a period of time, is determined, the amount of additional data to be transmitted in a current link direction over a future period of time can be determined; and When the threshold of resource utilization ratio is determined according to the service load, i.e., the amount of data, the threshold of resource utilization ratio can be determined according to the amount of the additional data and the spectrum efficiency of the system.

In an implementation, a statistic of the total amount of additional data to be transmitted in the current link direction over a period of time can be made, and a current threshold of resource utilization ratio can be determined according to the amount of the additional data and the spectrum efficiency of the system and taken as an upper limit of allocated resources in subsequent resource allocation.

Mode 3

When the service load of the link over the period of time, i.e., the amount of data transmitted on the link over a period of time, is determined, the amount of additional data to be transmitted over each type of service or each type of Radio Bearers (RBs) in a current link direction over a future period of time can be determined; and When the threshold of resource utilization ratio is determined according to the service load, i.e., the amount of data, the threshold of resource utilization ratio can be determined according to the amount of the additional data to be transmitted and the transmission efficiency of each type of service or each type of RB over the period of time.

In an implementation, a statistic of the total amount of additional data to be transmitted of each type of service or each type of RB in the current link direction over a period of time and the transmission efficiency of each type of service or each type of RB over the period of time can be made, and a current threshold of resource utilization ratio can be determined according to the total amount of the additional data to be transmitted and the transmission efficiency and taken as an upper limit of allocated resources in subsequent resource allocation.

In an implementation, the transmission efficiency is also the spectrum efficiency, and the transmission efficiency of a certain kind of service refers to the number of bits transmitted and the total number of frequency resources used in the service over a period of time, so its unit is bit/s/Hz in accordance with that of the spectrum efficiency.

Mode 4

When the service load of the link over the period of time, i.e., the amount of data transmitted on the link over a period of time, is determined, the amount of additional data to be transmitted of each UE in a current link direction over a future period of time can be determined; and When the threshold of resource utilization ratio is determined according to the service load, i.e., the amount of data, the threshold of resource utilization ratio can be determined according to the amount of the additional data to be transmitted and channel information of each UE.

In an implementation, a statistic of the amount of additional data to be transmitted of each UE in the current link direction over a period of time can be made, and a current threshold of resource utilization ratio can be determined according to the total amount of the additional data and channel information of each UE and taken as an upper limit of allocated resources in subsequent resource allocation.

In an implementation, a Channel Quality Indicator (CQI), Channel State Information (CSI), etc., can be adopted as the channel information.

In the foregoing four modes, the mode 1 is based upon a historical actual usage condition of resources, and the mode 2, the mode 3 and the mode 4 are based upon a data transmission demand of a service. For the mode 2, the mode 3 and the mode 4, only the performance of average spectrum efficiency of the system and the like is considered in the mode 2; an allocation and a statistic are made based upon the mode 2 according to the service type or the spectrum efficiency of RB in the mode 3; and the threshold of resource utilization ratio is determined taking into further account the factor of channel quality information of each UE and the like in the mode 4. In the mode 1, the mode 2, the mode 3 and the mode 4, the complexity of calculation ascends in sequence, the accuracy of estimation also improves in sequence and the performance becomes better in sequence.

Specifically, there is an inclusion relationship between "the total amount of additional data to be transmitted in a current link direction over a period of time" and "the total amount of additional data to be transmitted in each type of service or each type of RB in a current link direction over a period of time" in the mode 2 and the mode 3, that is, "each type of service or each type of RB" is also a part of "additional data in a current link direction", and the total amount of additional data to be transmitted in a current link is the sum of the amount of additional data to be transmitted of all the services (all the RBs).

Furthermore, in the mode 4, "the amount of additional data to be transmitted of each UE in a current link direction over a period of time" is also a part of "additional data in a current link direction", and the total amount of additional data to be transmitted in a current link is the sum of the amount of additional data to be transmitted of all the UEs.

A difference between the mode 3 and the mode 4 lies in different categorization of the total amount of additional data: consider which service it belongs to, for example, a Voice over IP (VOIP) service, a File Transfer Protocol (FTP) service or a World Wide Web (WWW) service, no mater which UE the service is delivered to in the mode 3; and consider which UE it belongs to without distinguishing whether it is an FTP service or a WWW service of the UE in the mode 4.

Specific flows of performing the foregoing four modes are substantially the same except for different objects in question and assisting information in use. An implementation of the inter-cell load balancing algorithm will be described below taking the mode 3 as an example.

In an implementation, objects subject to load balancing are all the subframes in the same direction in an interval of time T, and taking a downlink subframe of the LTE system as an example, assuming that a current downlink load threshold of the system is $P_{th}(n)$, then a load threshold of each downlink subframe is set to $P_{th}(n)$ prior to arrival of next time to update the load threshold so as to ensure that an actual resource utilization ratio will not exceed the threshold in frequency-domain scheduling.

1. Assuming that there are N types of RB which can be categorized by a QoS Class Indicator (QoS) class or logic channel attribution, then all the RBs existing in the downlink direction can be traversed to obtain data transmission demand and spectrum efficiency information of each RB.

2. The amount of additional data to be transmitted in the current link direction over the future period of time can be determined as follows:

A statistic of the amount of service of downlink data packets arriving of each RB over a period of time T, $data_i(n)$, is made, where $data_i(n)$ with a different value of the subscript i represents the amount of service of downlink data packets arriving of a different RB; and A service transmission demand of the amount of additional data to be transmitted in $RB_i$ over a future next period of time $nT\sim(n+1)T$, $DATA_i(n)$, is determined according to $data_i(n)$, where $DATA_i(n)$ is the amount of addition data to be transmitted in $RB_i$ in a current link direction over a future next period of time, and $RB_i$ with a different value of the subscript i represents a different RB.

In an implementation, a statistic of the amount of service of downlink data packets arriving of respective $RB_i$ over a period of time T, $data_i(n)$, can be made at a Radio Link Control (RLC) layer or a Packet Data Convergence Protocol (PDCP) layer, and a service transmission demand of $RB_i$ over a next period of time $nT\sim(n+1)T$, $DATA_i(n)$ can be estimated according to the amount of additional data.

When the service transmission demand of the amount of additional data to be transmitted in $RB_i$ over the future next period of time $nT\sim(n+1)T$, $DATA_i(n)$, is determined according to $data_i(n)$, the value may be smoothed using a forgetting factor filtering method or may not be smoothed.

Specifically, let $DATA_i(n)=\beta \cdot data_i(n)+(1-\beta)\cdot DATA_i(n-1)$ when smoothing is performed based on forgetting factor filtering, where $\beta$ is a forgetting factor, and $DATA_i(n-1)$ is a service transmission demand of the amount of additional data to be transmitted in $RB_i$ over a period of time $(n-1)T\sim nT$.

Or let $DATA_i(n)=data_i(n)$ when smoothing is not performed.

3. The transmission efficiency of each type of service or each type of RB over the period of time can be obtained as follows:

The number of Physical Resource Blocks (PRBs, the minimum unit of resource allocation in an LTE system) used by $RB_i$ over a period of time T, $N_{PRBused}(i,n)$, is obtained; and The spectrum efficiency of $RB_i$, $$\eta_i = \frac{SBR_i}{N_{PRBused}(i,n)},$$

is determined according to a service bit rate of $RB_i$, $SBR_i$.

In a specific implementation, the average transmission efficiency of $RB_i$ in a current cell can be obtained by obtaining the number of PRBs used by $RB_i$ over a period of time T, $N_{PRBused}(i,n)$, and determining the spectrum efficiency of $RB_i$, $$\eta_i = \frac{SBR_i}{N_{PRBused}(i,n)},$$

according to a service bit rate of $RB_i$, $SBR_i$, resulting from a statistic, where the statistic of the Service Bit Rate (SBR) is made as the amount of data actually transmitted over a period of time in the unit of bit/s.

4. The threshold of resource utilization ratio can be determined depending on the amount of additional data to be transmitted and the transmission efficiency of each type of service or each type of RB over the period of time as follows:

A downlink load threshold over a future next period of time $nT\sim(n+1)T$, $P_{th}(n+1)$, is determined in the equation of:

$$P_{th}(n+1) = \frac{\sum_{i=1}^{N} \frac{1}{\eta_i} \times DATA_i(n)}{N_{PRBtotal}},$$

wherein $N_{PRBtotal}$ is the total number of PRBs of all the subframes for downlink transmission of a Physical Downlink Shared Channel (PDSCH) over the future next period of time $nT\sim(n+1)T$, $DATA_i(n)$ is the service transmission demand of the amount of additional data to be transmitted in $RB_i$ over the future next period of time $nT\sim(n+1)T$, $\eta_i$ is the spectrum efficiency, and N is the total number of RBs.

In an implementation, when the downlink load threshold over the future next period of time $nT\sim(n+1)T$, $P_{th}(n+1)$ is determined in the equation, the threshold can be further determined in the equation of:

$$P_{th}(n+1) = \mathrm{MAX}\left\{P_{th\_min}, \frac{\sum_{i=1}^{N} \frac{1}{\eta_i} \times DATA_i(n)}{N_{PRBtotal}}\right\},$$

wherein $P_{th\_min}$ is a lower limit of the threshold of resource utilization ratio.

Figure 2:
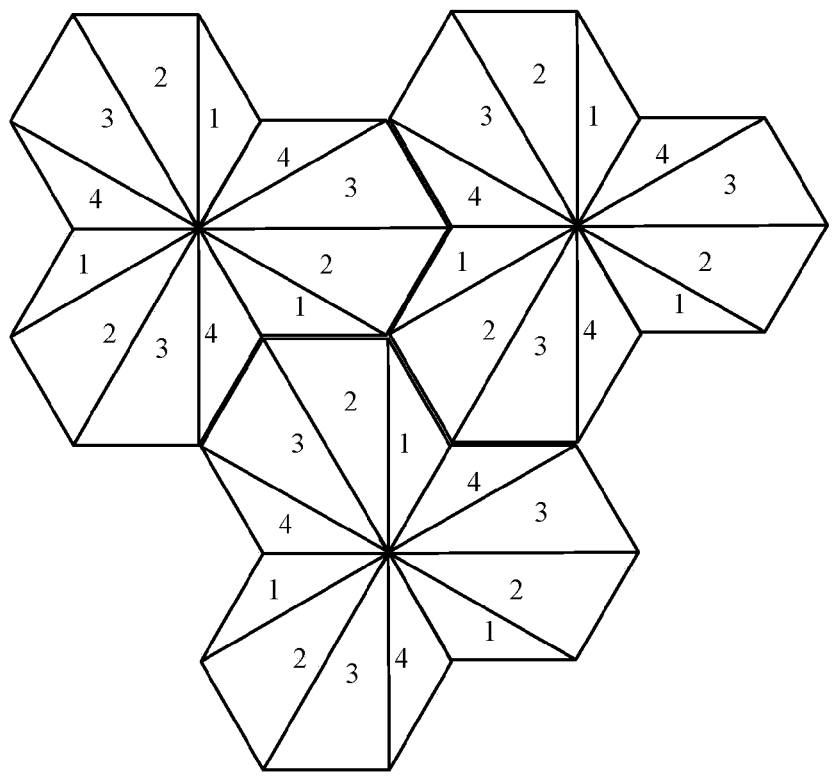
FIG. 2 is a schematic principle diagram of static beam coordination in the prior art.

Specifically, $P_{th\_min}$ is a lower limit of the threshold of resource utilization ratio, and the lower limit is set to avoid an unnecessary limitation on resource allocation and a resulting unnecessary loss of a frequency selectivity gain due to the threshold being set too small when the average load of the system is very light. Specifically, a typical value of $P_{th\_min}$ can be ⅓ or ¼, and actually be guaranteed equivalent to an upper limit of a resource utilization ratio of dissimilar-frequency networking, which can be determined depending on a topology of a current network or the number of cells strongly interfering adjacent cells among respective cells. For example, the value can be set to ¼ in the topology illustrated in FIG. 2.

In the mode 4, the channel information can be an CQI, CSI, etc., and it is essentially the same as the mode 3 in terms of determining the threshold depending on the channel information, for example, firstly the spectrum efficiency of each UE, $\eta_i^1$, is determined, and then $P_{tn}^1(n+1)$ is calculated from a service transmission demand of the amount of additional data to be transmitted of each UE, $DATA_i^1(n)$, and the total number of used PRBs, $P_{tn}^1(n+1)$, where $$P_{tn}^1(n+1) = \frac{\sum_{i=1}^{N} \frac{1}{\eta_i} \times DATA_i^1(n)}{N_{PRBtotal}}$$

Wherein $N_{PRBtotal}$ is the total number of PRBs of all the subframes for uplink transmission of a PUSCH over the future next period of time $nT\sim(n+1)T$, $DATA_i^1(n)$ is a service transmission demand of the amount of additional data to be transmitted of the UE over the future next period of time $nT\sim(n+1)T$, $\eta_i^1$ is the spectrum efficiency of each UE, and M is the total number of UEs.

In an implementation, when a service load of a link over a period of time, i.e., the amount of data transmitted on the link over a period of time, is determined, the length of the period of time can be set depending on the period in which a statistic of a service load level is made in interference coordination. This is performed for the purpose of a better implementation in combination with the inter-cell interference coordination technology, and the length T of the statistic window can be set to be consistent with the period in which a statistic of a service load level is made in interference coordination: for example, an uplink statistic period is set to be consistent with an update period of HII and a downlink statistic period is set to be consistent with an update period of RNTP in the LTE system.

As can be seen from foregoing embodiments, the threshold of resource utilization ratio can be determined via inter-subframe load balancing process as described above so that particularly a scheduler in a base station can ensure that the foregoing threshold be strictly observed in consecutive subframes in the same direction other than the last subframe to thereby distribute a service load in the system evenly to the respective subframes in the same direction.

As can be seen, the problem that a service load fluctuates with respective subframes in the time division duplex system can be addressed via inter-subframe load balancing process to thereby create an advantageous condition for implementing the inter-cell interference coordination technology.

After addressing the problem that the distribution difference of an instantaneous service load level across different subframes is sharp in the TDD system, an embodiment of the invention further proposes an optimized interference alleviation solution for interference alleviation of the time division duplex-orthogonal frequency division multiplexing system, and an underlying idea thereof is as follows:

1) Firstly a service load in the same link direction is distributed evenly to respective subframes via an inter-subframe load balancing algorithm to thereby achieve time-domain interference balance;

2) Next interference alleviation, i.e., interference coordination/alleviation in the frequency domain, power and the space domain, in the respective subframes is further achieved in interference coordination solutions such as the FFR, static/semi-static ICIC, beam coordination and the like; and 3). A scheduler of a base station comprehensively takes into account strategies and limiting conditions resulting from the foregoing sets of mechanisms to thereby create a resource allocation solution with interference alleviation as well as joint optimization in a plurality of resource dimensions.

Due to cooperation of the foregoing sets of mechanisms, an embodiment of the invention provides an interference alleviation solution with joint optimization in a plurality of resource dimensions for the time division duplex-orthogonal frequency division multiplexing system to thereby achieve a further optimized interference alleviation effect. A specific implementation of the solution will be described below with reference to the drawings.

Figure 4:
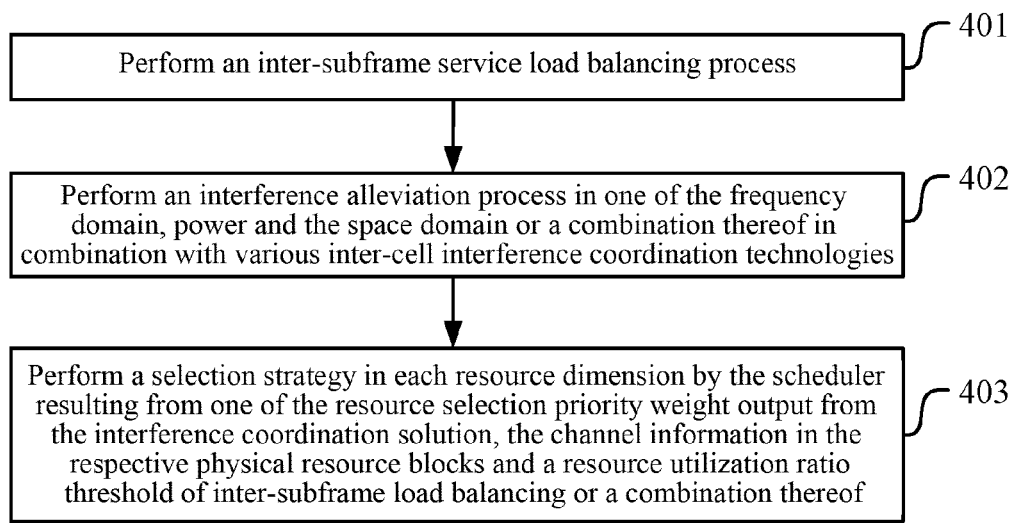
FIG. 4 is schematic flow chart of performing a method for processing inter-cell interference according to an embodiment of the invention.

FIG. 4 is a schematic flow chart of performing a method for processing inter-cell interference, and as illustrated, inter-cell interference can be processed in the following steps:

The step 401 is to perform an inter-subframe service load balancing process; and The step 402 is to perform an interference alleviation process in one of the frequency domain, power and the space domain or a combination thereof in combination with various inter-cell interference coordination technologies.

In an implementation, the implementation of the step 401 can be described with reference to the implementation of FIG. 3.

In an implementation, the interference coordination technologies in the step 402 can include one or a combination of the following technologies:

SFR, FFR, static/semi-static/dynamic ICIC, static/semi-static/dynamic beam coordination and multi-cell coordinated scheduling.

In the step 402, after the service load of the system is distributed evenly to respective subframes in the same direction via the inter-subframe load balancing algorithm, inter-cell same-frequency interference of the respective subframes can be further alleviated in combination with an inter-cell interference coordination algorithm supported by a base station. After inter-subframe load balancing, further interference alleviation can be performed in a series of solutions of the FFR, SFR, static/semi-static ICIC, beam coordination and the like to achieve an interference alleviation solution in a plurality of resource dimensions with joint optimization of resources of the time domain, the frequency domain, power and the space domain.

A specific implementation of the step 402 depends upon the inter-cell interference coordination solution(s) implemented in combination with the inter-subframe load balancing process, and in order to better understand the implementation of both of the them in combination, a solution of performing inter-subframe load balancing combined with an interference alleviation rule of inter-cell interference coordination in resource allocation of a scheduler will be introduced below still taking the semi-static ICIC technology supported in the LTE system as an example.

An interference alleviation rule generating module of the semi-static ICIC technology can make a statistic of resource demands of edge users and cell center users over a period of time to generate RNTP, HII and other parameters of the current cell and actually measure uplink interference levels in respective PRBs to generate an OI parameter; and also the module receives HII, OI, RNTP information and other information of an adjacent cell passed via an X2 interface (an interface between base stations) and generates a resource selection priority weight $P_{inter\_ICIC}$ of the current cell in accordance with an algorithm set in the system, where the priority weight $P_{inter\_ICIC}$ is a function of the foregoing load information such as HII, OI, HII and the like and location information of a user, and can be expressed in the equation of:

$$P_{inter\_ICIC}=f(\text{load\_information,location\_information},\ldots)$$

In addition to the foregoing priority weight of ICIC, a scheduling strategy of the scheduler of a base station can further take into account a weight $P_{Schdl\_CQI}$ obtained from Channel Quality Indicators (CQIs) in respective PRBs so as to perform frequency selective scheduling:

$$P_{Schdl\_CQI}=h(CQI_{PRB},\ldots)$$

If inter-subframe load balancing is disregarded, then a scheduling strategy $P_{Schdl\_ICIC}$ generally taking into account inter-cell interference coordination can also be expressed as:

$$P_{Schdl\_ICIC}=\eta(P_{inter\_ICIC},P_{Schdl\_CQI})$$

f, h and η represent different functions.

In an implementation, the following step can be further included:

The step 403 is to perform a selection strategy in each resource dimension by the scheduler resulting from one of the resource selection priority weight output from the interference coordination solution, the channel information in the respective physical resource blocks and the threshold of resource utilization ratio of inter-subframe load balancing or a combination thereof.

In an implementation of the step 403, after considering inter-subframe load balancing, an interference alleviation scheduling strategy $P_{Schdl\_ICIC\_subframeLB}$ in the scheduler taking into account joint optimization in a plurality of resource dimensions can be expressed as $$\begin{cases} P_{Schdl\_ICIC\_subframeLB} = \eta(P_{inter\_ICIC}, P_{Schdl\_CQI}) \\ N_{PRB\_usable} \le P_{th}(n+1) \end{cases}$$

$N_{PRB\_usable}$ is the number of PRBs useable in each subframe in the link direction over a period of time nT~(n+1)T.

An interference alleviation solution with joint optimization can be created by combining inter-subframe load balancing with an interference alleviation strategy output from various inter-cell interference alleviation solutions, e.g., the SFR, FFR, static/semi-static ICIC, beam coordination and the like, in a resource allocation strategy of a scheduler as described above, and for the TDD system, this solution can achieve a more prominent interference alleviation effect compared with the ICIC solution alone.

Based upon the same inventive idea, embodiments of the invention further provide a device for processing inter-subframe service load balancing and a device for processing inter-cell interference, and since these devices address the problem under similar principles to the method for processing inter-subframe service load balancing and the method for processing inter-cell interference, the implementations of these devices can refer to the implementations of the methods, and a repeated description thereof will be omitted here.

Figure 5:
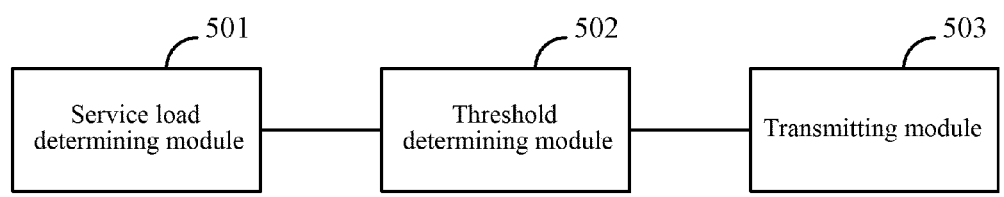
FIG. 5 is a schematic structural diagram of a device for processing inter-subframe service load balancing according to an embodiment of the invention.

FIG. 5 is a schematic structural diagram of a device for processing inter-subframe service load balancing, and as illustrated, the device for processing inter-subframe service load balancing can include:

A service load determining module 501 configured to determine a service load of a link over a period of time;

A threshold determining module 502 configured to determine a threshold of resource utilization ratio according to the service load; and A transmitting module 503 configured to transmit service data in respective subframes according to the threshold of resource utilization ratio.

In an implementation, the service load determining module can be further configured to determine the amount of data transmitted in all the subframes in the same link direction over a past period of time when determining the service load of the link over the period of time; and The threshold determining module can be further configured to determine the threshold of resource utilization ratio according to an average usage condition of resources in each subframe over the period of time when determining the threshold of resource utilization ratio according to the service load.

In an implementation, the service load determining module can be further configured to determine the amount of additional data to be transmitted in a current link direction over a future period of time when determining the service load of the link over the period of time; and The threshold determining module can be further configured to determine the threshold of resource utilization ratio according to the amount of additional data and the spectrum efficiency of the system when determining the threshold of resource utilization ratio according to the service load.

In an implementation, the service load determining module can be further configured to determine the amount of additional data to be transmitted in each type of service or each type of RB in the current link direction over the future period of time when determining the amount of additional data to be transmitted in the current link direction over the future period of time; and The threshold determining module can be further configured to determine the threshold of resource utilization ratio according to the amount of additional data to be transmitted and the transmission efficiency of each type of service or each type of RB over the period of time when determining the threshold of resource utilization ratio according to the amount of data.

In an implementation, the service load determining module can include:

An RB statistic unit configured to make a statistic of the amount of service of downlink data packets arriving of each RB over a period of time T, $data_i(n)$; and An RB determining unit configured to determine a service transmission demand of the amount of additional data to be transmitted in $RB_i$ over a future next period of time $nT \sim (n+1)T$, $DATA_i(n)$, according to $data_i(n)$, where $RB_i$ with a different value of the subscript i represents a different RB.

In an implementation, the RB determining unit can be further configured to make $DATA_i(n)=\beta \cdot data_i(n)+(1-\beta) \cdot DATA_i(n-1)$ or $DATA_i(n)=data_i(n)$ when determining the service transmission demand of the amount of additional data to be transmitted in $RB_i$ over the future next period of time $nT \sim (n+1)T$, $DATA_i(n)$ according to $data_i(n)$, wherein $\beta$ is a forgetting factor, and $DATA_i(n-1)$ is a service transmission demand of the amount of additional data to be transmitted in $RB_i$ over a period of time before $nT \sim (n+1)T$.

In an implementation, the threshold determining module can be further configured to obtain the number of PRBs used for $RB_i$ over a period of time T, $N_{PRBused}(i,n)$, and then determining the spectrum efficiency of $RB_i$, $$\eta_i = \frac{SBR_i}{N_{PRBused}(i,n)},$$

according to a service bit rate of $RB_i$, $SBR_i$, when obtaining the transmission efficiency of each type of service or each type of RB over the period of time, where $RB_i$ with a different value of the subscript i represents a different RB.

In an implementation, the threshold determining module can be further configured to determine a downlink load threshold over a future next period of time $nT \sim (n+1)T$, $P_{th}(n+1)$, in the equation of:

$$P_{th}(n+1) = \frac{\sum_{i=1}^{N} \frac{1}{\eta_i} \times DATA_i(n)}{N_{PRBtotal}}$$

when determining the threshold of resource utilization ratio according to the amount of additional data to be transmitted and the transmission efficiency of each type of service or each type of RB over the period of time.

Wherein $N_{PRBtotal}$ is the total number of PRBs of all the subframes for downlink transmission of a PDSCH over the future next period of time $nT \sim (n+1)T$, $DATA_i(n)$ is a service transmission demand of the amount of additional data to be transmitted in $RB_i$ over the future next period of time $nT \sim (n+1)T$, $\eta_i$ is the spectrum efficiency of $RB_i$, N is the total number of $RB_i$ and $RB_i$ with a different value of the subscript i represents a different RB.

In an implementation, the threshold determining module can be further configured to determine the downlink load threshold over the future next period of time $nT \sim (n+1)T$, $P_{th}(n+1)$, in the equation of:

$$P_{th}(n+1) = \text{MAX}\left\{P_{th\_min}, \frac{\sum_{i=1}^{N} \frac{1}{\eta_i} \times DATA_i(n)}{N_{PRBtotal}}\right\}$$

Wherein $P_{th\_min}$ is a lower limit of the threshold of resource utilization ratio.

In an implementation, the service load determining module can be further configured to determine the amount of additional data to be transmitted of each UE in the current link direction over the future period of time when determining the amount of additional data to be transmitted in the current link direction over the future period of time; and The threshold determining module can be further configured to determine the threshold of resource utilization ratio according to the amount of additional data to be transmitted and channel information of each UE when determining the threshold of resource utilization ratio according to the amount of data.

In an implementation, the service load determining module can include:

A UE statistic unit configured to make a statistic of the amount of service of downlink uplink data packets arriving of each UE over a period of time T, $data_i(n)$; and A UE determining unit configured to determine a service transmission demand of the amount of additional data to be transmitted of each UE over a future next period of time nT~(n+1)T, $DATA_i^1(n)$ according to $data_i^1(n)$.

In an implementation, the UE determining unit can be further configured to make $DATA_i^1(n)=\beta \cdot data_i^1(n)+(1-\beta) \cdot DATA_i^1(n-1)$ or $DATA_i^1(n)=data_i^1(n)$ when determining the service transmission demand of the amount of additional data to be transmitted of each UE over the future next period of time nT~(n+1)T, $DATA_i^1(n)$, according to $data_i^1(n)$, wherein $\beta$ is a forgetting factor, and $DATA_i^1(n-1)$ is a service transmission demand of the amount of additional data to be transmitted of each UE over a period of time before nT~(n+1)T.

In an implementation, the threshold determining module can be further configured to obtain the number of PRBs used by each UE over a period of time T, $N_{PRBused}^1(i,n)$, and then determine the spectrum efficiency of each UE, $$\eta_i^1 = \frac{SBR_i^1}{N_{PRBused}^1(i, n)},$$

according to a service bit rate of each UE, $SBR_i^1$, when obtaining the channel information of each UE over the period of time.

In an implementation, the threshold determining module can be further configured to determine a downlink an uplink load threshold over a future next period of time nT~(n+1)T, $P^1th(n+1)$, in the equation of:

$$P_{th}^1(n+1) = \frac{\sum_{i=1}^{M} \frac{1}{\eta_i^1} \times DATA_i^1(n)}{N_{PRBtotal}}$$

when determining the threshold of resource utilization ratio according to the amount of additional data to be transmitted and the channel information of each UE over the period of time.

Wherein $N_{PRBtotal}$ is the total number of PRBs of all the subframes for uplink transmission of a PUSCH over the future next period of time nT~(n+1)T, $DATA_i^1(n)$ is a service transmission demand of the amount of additional data to be transmitted in the UE over the future next period of time nT~(n+1)T, $\eta_i^1$ is the spectrum efficiency of each UE, and M is the total number of UEs.

In an implementation, the threshold determining module can be further configured to determine the uplink load threshold over the future next period of time nT~(n+1)T, $P^1th(n+1)$, in the equation of:

$$P_{th}^1(n+1) = MAX\left\{P_{th\_min}, \frac{\sum_{i=1}^{M} \frac{1}{\eta_i^1} \times DATA_i^1(n)}{N_{PRBtotal}}\right\}$$

Wherein $P_{th\_min}$ is a lower limit of the threshold of resource utilization ratio.

In an implementation, the service load determining module can be further configured to set the length of the period of time depending on the period in which a statistic of a service load level is made in interference coordination when determining the service load of the link over the period of time.

In an implementation, the service load determining module can be further configured to set an uplink static period to be consistent with or equivalent to an update period of HII and a downlink static period to be consistent with or equivalent to an update period of RNTP if a selected inter-cell interference coordination technology is semi-static ICIC when making the statistic of the period of the service load level.

Figure 6:
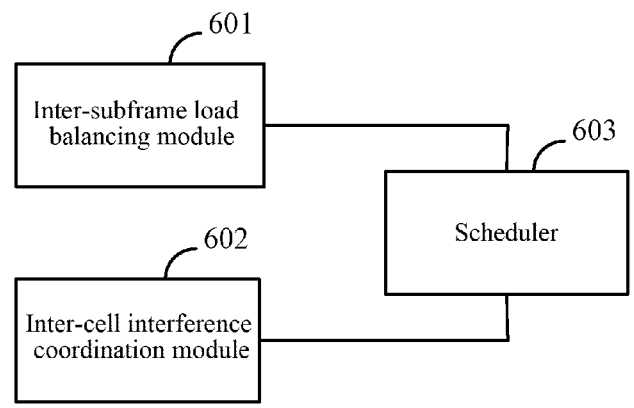
FIG. 6 is a schematic structural diagram of a device for processing inter-cell interference according to an embodiment of the invention.

FIG. 6 is a schematic structural diagram of a device for processing inter-cell interference, and as illustrated, the device for processing inter-cell interference can include:

An inter-subframe load balancing module 601 configured to perform an inter-subframe service load balancing process, and the inter-subframe service load balancing process can refer to the foregoing embodiments; and An inter-cell interference coordination module 602 configured to perform an interference alleviation process in one of the frequency domain, power and the space domain or a combination thereof in combined with various inter-cell interference coordination technologies.

In an implementation, the inter-cell interference coordination module can be further configured to adopt the interference coordination technologies including one or a combination of the following technologies: SFR, FFR, static/semi-static/dynamic ICIC, static/semi-static/dynamic beam coordination and multi-cell coordinated scheduling.

In an implementation, the device for processing inter-cell interference can further include:

A scheduler 603 configured to perform a selection strategy in each resource dimension according to one of a resource selection priority weight output from the interference coordination technologies, channel information in respective physical resource blocks and a threshold of resource utilization ratio of inter-subframe load balancing or a combination thereof.

In order to facilitate description, the respective components of the foregoing devices have been described respectively by dividing them into various modules or units in function. Of course, the functions of respective modules or units can be achieved in the same one or a plurality of software(s) or hardware(s) to implement the invention.

As can be seen from the foregoing embodiments, the embodiments of the invention propose a method and device for achieving a balance between a system service load and an interference level across subframes in an inter-subframe load balancing algorithm and then further achieving interference alleviation with joint optimization in a plurality of resource dimensions of the time domain, the frequency domain, power and even the space domain in combination with an inter-cell interference coordination algorithm in the time division duplex system.

Specifically, in the technical solution of the embodiments of the invention, a multi-dimension joint interference alleviation solution of the time division duplex system is proposed so that firstly a service load of the TDD system is distributed evenly to respective subframes in the same direction in an inter-subframe load balancing algorithm to thereby achieve time-domain balance of interference, and then an inter-cell interference alleviation strategy with joint optimization in a plurality of resource dimensions is further achieved in the frequency domain, power and the space domain in combination with various inter-cell interference coordination technologies and is applied in a scheduling strategy of a base station for the purpose of optimized interference alleviation.

Furthermore, in the solution that the time-domain balance of interference is firstly implemented in the inter-subframe load balancing algorithm, a current threshold of resource utilization ratio for resource allocation by a scheduler is generated according to a part or all of historically statistical resource usage information, statistical amount of data to be transmitted, an average spectrum efficiency of the system, data transmission demands of each type of service or groups of RB in a cell, the average transmission efficiency of each type of service or groups of RB in the cell, data transmission demands of respective UEs, channel quality information of respective UEs and other information, and inter-subframe load balancing is achieved with the threshold.

Furthermore, when the threshold of resource utilization ratio calculated in the four modes in combination with a part or all of the foregoing information is very low, a lower limit value of the threshold of resource utilization ratio, $P_{th\_min}$, can be further set so as to avoid any unnecessary limitation on frequency selectivity scheduling due to the threshold.

Furthermore, in order to better combine with inter-cell interference coordination technology, an information statistic period can be set to be identical with or equivalent to the value of a period for making a statistic of resource demands of respective groups of users used in the interference coordination technology.

Furthermore, when determining the information statistic period, if a selected inter-cell interference coordination technology is semi-statistic ICIC, then an uplink statistic period can be set to be consistent with or equivalent to a period of HII and a downlink statistic period can be set to be consistent with or equivalent to a period of RNTP.

Furthermore, after time-domain balance of interference is achieved in an inter-subframe load balancing algorithm, in order to further achieve interference alleviation, the inter-subframe load balancing algorithm can be combined with various inter-cell interference coordination technologies by which an interference alleviation effect in the frequency domain, power and even the space domain is achieved.

Furthermore, inter-cell interference coordination technologies that can be selected include but will not be limited to SFR, FFR, static/semi-static/dynamic ICIC, static/semi-static/dynamic beam coordination and multi-cell coordinated scheduling.

Furthermore, a scheduler can comprehensively take into account a resource selection priority weight output from a selected interference coordination solution, channel information in respective physical resource blocks and a threshold of resource utilization ratio of inter-subframe load balancing so as to implement an interference alleviation solution with joint optimization in a plurality of resource dimensions.

As can be seen, the embodiments of the invention propose an optimized interference coordination/alleviation solution of the time division duplex-orthogonal frequency division multiplexing system, that is, an interference alleviation solution that joint optimization in a plurality of resource dimensions of the time domain, the frequency domain, power and even the space domain is achieved by combining an inter-subframe load balancing algorithm with an inter-cell interference coordination technology. The solution firstly addresses the drawback that a service load of the TDD system fluctuates with respective subframes in an inter-subframe load balancing algorithm to thereby achieve time-domain balance of an interference level and then further achieves interference coordination and alleviation of inter-cell interference in the frequency domain, power and even space domain in combination with various interference coordination solutions. Due to the presence of the inter-subframe load balancing algorithm, the solution has a better interference alleviation effect than the use of an inter-cell interference coordination technology alone.

This solution can alleviate such a phenomenon that a poor interference alleviation effect may result from load information being not well adapted to a dynamic variation of service load across respective subframes in the TDD system; and the solution can further alleviate inter-cell interference in the LTE system and improve the overall throughput performance of the system and a quality of service for users in the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method for processing inter-subframe service load balancing, comprising:
   determining a service load of a link over a period of time;
   determining a threshold of resource utilization ratio according to the service load; and
   transmitting service data in respective subframes according to the threshold of resource utilization ratio;
   wherein the amount of additional data to be transmitted in a current link direction over a future period of time is determined when the service load of the link over the period of time is determined; and
   the threshold of resource utilization ratio is determined according to the amount of additional data and the spectrum efficiency of a system when the threshold of resource utilization ratio is determined according to the service load, wherein the spectrum efficiency is the number of bits transmitted per second over a transmission channel with a given bandwidth
   wherein the amount of additional data to be transmitted in each type of service or each type of Radio Bearer, RB, in the current link direction over the future period of time is determined when the amount of additional data to be transmitted in the current link direction over the future period of time is determined; and
   the threshold of resource utilization ratio is determined according to the amount of additional data to be transmitted and the transmission efficiency of each type of service or each type of RB over the period of time when the threshold of resource utilization ratio is determined according to the amount of data,
   wherein the amount of additional data to be transmitted in the current link direction over the future period of time is determined by: making a statistic of the amount of arriving downlink data packets of each RB over a period of time T, $data_i(n)$; and
   determining a service transmission demand of the amount of additional data to be transmitted in $RB_i$ over a future next period of time $nT\sim(n+1)T$, $DATA_i(n)$, according to $data_i(n)$, wherein $RB_i$ with a different value of the subscript i represents a different RB,
   wherein make $DATA_i(n)=\beta \cdot data_i(n)+(1-\beta) \cdot DATA_i(n-1)$ or $DATA_i(n)=data_i(n)$ when the service transmission demand of the amount of additional data to be transmitted in $RB_i$ over the future next period of time $nT\sim(n+1)T$, $DATA_i(n)$, is determined according to $data_i(n)$, wherein $\beta$ is a smooth factor and $0 \le \beta \le 1$, and $DATA_i(n-1)$ is a service transmission demand of the amount of additional data to be transmitted in $RB_i$ over a period of time before $nT\sim(n+1)T$.

2. The method according to claim 1, wherein the transmission efficiency of each type of service or each type of RB over the period of time is obtained by:
   obtaining the number of PRBs used for $RB_i$ over a period of time T, $N_{PRBused}(i,n)$, wherein $RB_i$ with a different value of the subscript i represents a different RB; and $$\eta_i = \frac{SBR_i}{N_{PRBused}(i,n)},$$

determining the spectrum efficiency of $RB_i$, according to a service bit rate of $RB_i$, SBR.

3. The method according to claim 1, wherein the threshold of resource utilization ratio is determined according to the amount of additional data to be transmitted and the transmission efficiency of each type of service or each type of RB over the period of time by:
   determining a downlink load threshold over a future next period of time $nT\sim(n+1)T$, $P_{th}(n+1)$, in the equation of:

$$P_{th}(n+1) = \frac{\sum_{i=1}^{N} \frac{1}{\eta_i} \times DATA_i(n)}{N_{PRBtotal}},$$

wherein $N_{PRBtotal}$ is the total number of PRBs of all the subframes for downlink transmission of a Physical Downlink Shared Channel, PDSCH, over the future next period of time $nT\sim(n+1)T$, $DATA_i(n)$ is a service transmission demand of the amount of additional data to be transmitted in $RB_i$ over the future next period of time $nT\sim(n+1)T$, $\eta_i$ is the spectrum efficiency of $RB_i$, N is the total number of RB, and $RB_i$ with a different value of the subscript i represents a different RB,
   wherein the downlink load threshold over the future next period of time $nT\sim(n+1)T$, $P_{th}(n+1)$, is further determined in the equation of:

$$P_{th}(n+1) = MAX \left\{ P_{th\_min}, \frac{\sum_{i=1}^{M} \frac{1}{\eta_i} \times DATA_i(n)}{N_{PRBtotal}} \right\},$$

where $P_{th\_min}$ is a lower limit of the threshold of resource utilization ratio.

4. A method for processing inter-subframe service load balancing, comprising:
   determining a service load of a link over a period of time;
   determining a threshold of resource utilization ratio according to the service load; and
   transmitting service data in respective subframes according to the threshold of resource utilization ratio;
   wherein the amount of additional data to be transmitted in a current link direction over a future period of time is determined when the service load of the link over the period of time is determined; and
   the threshold of resource utilization ratio is determined according to the amount of additional data and the spectrum efficiency of a system when the threshold of resource utilization ratio is determined according to the service load, wherein the spectrum efficiency is the number of bits transmitted per second over a transmission channel with a given bandwidth;

wherein the amount of additional data to be transmitted of each User Equipment, UE, in the current link direction over the future period of time is determined when the amount of additional data to be transmitted in the current link direction over the future period of time is determined; and the threshold of resource utilization ratio is determined according to the amount of additional data to be transmitted and channel information of each UE when the threshold of resource utilization ratio is determined according to the amount of data, wherein the amount of additional data to be transmitted in the current link direction over the future period of time is determined by:

making a statistic of the amount of arriving uplink data packets of each UE over a period of time T, $data_i^1(n)$; and determining a service transmission demand of the amount of additional data to be transmitted in each UE over a future next period of time $nT \sim (n+1)T$, $DATA_i^1(n)$, according to $data_i^1(n)$, wherein make $DATA_i^1(n) = \beta \cdot data_i^1(n) + (1-\beta) \cdot DATA_i(n-1)$ or $DATA_i^1(n) = data_i^1(n)$ when the service transmission demand of the amount of additional data to be transmitted in each UE over the future next period of time $nT \sim (n+1)T$, $DATA_i^1(n)$, is determined according to $data_i^1(n)$, wherein $\beta$ is a smooth factor and $0 \leq \beta \leq 1$, and $DATA_i^1(n-1)$ is a service transmission demand of the amount of additional data to be transmitted in each UE over a period of time before $nT \sim (n+1)T$.

5. The method according to claim 4, wherein the channel information of each UE over the period of time is obtained by:

obtaining the number of PRBs used by each UE over a period of time T, $N^1_{PRBused}(i,n)$; and $$\eta_i^1 = \frac{SBR_i^1}{N^1_{PRBused}(i,n)},$$

determining the spectrum efficiency of each UE, according to a service bit rate of each UE, $SBR_i^1$.

6. The method according to claim 4, wherein the threshold of resource utilization ratio is determined according to the amount of additional data to be transmitted and the channel information of each UE over the period of time by:

determining an uplink load threshold over a future next period of time $nT \sim (n+1)T$, $P^1_{th}(n+1)$, in the equation of:

$$P^1_{th}(n+1) = \frac{\sum_{i=1}^{M} \frac{1}{\eta_i^1} \times DATA_i^1(n)}{N_{PRBtotal}},$$

wherein $N_{PRBtotal}$ is the total number of PRBs of all the subframes for uplink transmission of a Physical Uplink Shared Channel, PUSCH, over the future next period of time $nT \sim (n+1)T$, $DATA_i^1(n)$ is a service transmission demand of the amount of additional data to be transmitted in the UE over the future next period of time $nT \sim (n+1)T$, $\eta_i^1$ is the spectrum efficiency of each UE, and M is the total number of UEs, wherein the uplink load threshold over the future next period of time $nT \sim (n+1)T$, $P^1_{th}(n+1)$, is further determined in the equation of:

$$P^1_{th}(n+1) = MAX \left\{ P_{th\_min}, \frac{\sum_{i=1}^{M} \frac{1}{\eta_i^1} \times DATA_i^1(n)}{N_{PRBtotal}} \right\},$$

wherein $P_{th\_min}$ is a lower limit of the threshold of resource utilization ratio.

7. The method according to claim 1, wherein the length of the period of time is set depending on a period in which a statistic of a service load level in interference coordination is made when the service load of the link over the period of time is determined, wherein an uplink static period is set to be consistent with or equivalent to an update period of High Interference Indicator, HII, and a downlink static period is set to be consistent with or equivalent to an update period of Relative-narrowband Tx Power indicator, RNTP, if a selected inter-cell interference coordination technology is semi-static Inter-Cell Interference Coordination, ICIC, when the statistic of the period of the service load level is made.

8. A method for processing inter-cell interference, comprising the steps of:

performing an inter-subframe service load balancing process according to claim 1; and performing an interference alleviation process in one or a combination of the frequency domain, power and the space domain in combination with various inter-cell interference coordination technologies.

9. The method according to claim 8, wherein the interference coordination technologies comprise one or a combination of the following technologies:

Soft Frequency Reuse, SFR, Fractional Frequency Reuse, FFR, static/semi-static/dynamic ICIC, static/semi-static/dynamic beam coordination and multi-cell coordinated scheduling.

10. The method according to claim 8, further comprising:

performing a selection strategy in each resource dimension by a scheduler resulting from one or a combination of a resource selection priority weight output from the interference coordination technologies, channel information in respective physical resource blocks and a threshold of resource utilization ratio of inter-subframe load balancing.

11. A device for processing inter-subframe service load balancing, comprising:

a processor configured to determine a service load of a link over a period of time and to determine a threshold of resource utilization ratio according to the service load; and a transmitter configured to transmit service data in respective subframes according to the threshold of resource utilization ratio;

wherein the processor is further configured to determine the amount of additional data to be transmitted in a current link direction over a future period of time when determining the service load of the link over the period of time and to determine the threshold of resource utilization ratio according to the amount of additional data and the spectrum efficiency of a system when determining the threshold of resource utilization ratio according to the service load, wherein the spectrum efficiency is the number of bits transmitted per second over a transmission channel with a given bandwidth;

wherein the processor is further configured to determine the amount of additional data to be transmitted in each type of service or each type of RB in the current link direction over the future period of time when determining the amount of additional data to be transmitted in the current link direction over the future period of time; and to determine the threshold of resource utilization ratio according to the amount of additional data to be transmitted and the transmission efficiency of each type of service or each type of RB over the period of time when determining the threshold of resource utilization ratio according to the amount of data, wherein the processor is further configured to make a statistic of the amount of arriving downlink data packets of each Radio Bearer, RB, over a period of time T, $data_i(n)$; and to determine a service transmission demand of the amount of additional data to be transmitted in $RB_i$ over a future next period of time $nT\sim(n+1)T$, $DATA_i(n)$, according to $data_i(n)$, wherein $RB_i$ with a different value of the subscript i represents a different RB, wherein the processor is further configured to make $DATA_i(n)=\beta \cdot data_i(n)+(1-\beta)\cdot DATA_i(n-1)$ or $DATA_i(n)=data_i(n)$ when determining the service transmission demand of the amount of additional data to be transmitted in $RB_i$ over the future next period of time $nT\sim(n+1)T$, $DATA_i(n)$ according to $data_i(n)$, wherein $\beta$ is a smooth factor and $0\le\beta\le 1$, and $DATA_i(n-1)$ is a service transmission demand of the amount of additional data to be transmitted in $RB_i$ over a period of time before $nT\sim(n+1)T$, wherein the processor is further configured to obtain the number of PRBs used for $RB_i$ over a period of time T, $N_{PRBused}(i,n)$, and then determine the spectrum efficiency of $RB_i$, $$\eta_i = \frac{SBR_i}{N_{PRBused}(i, n)},$$

according to a service bit rate of $RB_i$, $SBR_i$ when obtaining the transmission efficiency of each type of service or each type of RB over the period of time, wherein $RB_i$ with a different value of the subscript i represents a different RB.

12. The device according to claim 11, wherein the processor is further configured to determine a downlink load threshold over a future next period of time $nT\sim(n+1)T$, $P_{th}(n+1)$, in the equation of:

$$P_{th}(n+1) = \frac{\sum_{i=1}^{N} \frac{1}{\eta_i} \times DATA_i(n)}{N_{PRBtotal}}$$

when determining the threshold of resource utilization ratio according to the amount of additional data to be transmitted and the transmission efficiency of each type of service or each type of RB over the period of time, wherein $N_{PRBtotal}$ is the total number of PRBs of all the subframes for downlink transmission of a PDSCH over the future next period of time $nT\sim(n+1)T$, $DATA_i(n)$ is a service transmission demand of the amount of additional data to be transmitted in $RB_i$ over the future next period of time $nT\sim(n+1)T$, $\eta_i$ is the spectrum efficiency of $RB_i$, N is the total number of RBs, and $RB_i$ with a different value of the subscript i represents a different RB, wherein the processor is further configured to further determine the downlink load threshold over the future next period of time $nT\sim(n+1)T$, $P_{th}(n+1)$, in the equation of:

$$P_{th}(n+1) = MAX\left\{P_{th\_min}, \frac{\sum_{i=1}^{N} \frac{1}{\eta_i} \times DATA_i(n)}{N_{PRBtotal}}\right\},$$

wherein $P_{th\_min}$ is a lower limit of the threshold of resource utilization ratio.

13. A device for processing inter-subframe service load balancing, comprising:

a processor configured to determine a service load of a link over a period of time and to determine a threshold of resource utilization ratio according to the service load; and a transmitter configured to transmit service data in respective subframes according to the threshold of resource utilization ratio;

wherein the processor is further configured to determine the amount of additional data to be transmitted in a current link direction over a future period of time when determining the service load of the link over the period of time and to determine the threshold of resource utilization ratio according to the amount of additional data and the spectrum efficiency of a system when determining the threshold of resource utilization ratio according to the service load, wherein the spectrum efficiency is the number of bits transmitted per second over a transmission channel with a given bandwidth; wherein the processor is further configured to determine the amount of additional data to be transmitted of each UE in the current link direction over the future period of time when determining the amount of additional data to be transmitted in the current link direction over the future period of time; and to determine the threshold of resource utilization ratio according to the amount of additional data to be transmitted and channel information of each UE when determining the threshold of resource utilization ratio according to the amount of data, wherein the processor further configured to make a statistic of the amount of arriving uplink data packets of each UE over a period of time T, $data_i^1(n)$; and determine a service transmission demand of the amount of additional data to be transmitted of each UE over a future next period of time $nT\sim(n+1)T$, $DATA_i^1(n)$, according to $data_i^1(n)$, wherein the processor is further configured to make $DATA_i^1(n)=\beta\cdot data_i^1(n)+(1-\beta)\cdot DATA_i^1(n-1)$ or $DATA_1^1(n)=data_1^1(n)$ when determining the service transmission demand of the amount of additional data to be transmitted in each UE over the future next period of time $nT\sim(n+1)T$, according to $data_i^1(n)$ wherein $\beta$ is a smooth factor and $0\le\beta\le 1$, and $DATA_i^1(n-1)$ is a service transmission demand of the amount of additional data to be transmitted in each UE over a period of time before $nT\sim(n+1)T$, wherein the processor is further configured to obtain the number of PRBs used by each UE over a period of time T, $N_{NRBused}(i,n)$, and then determine the spectrum efficiency of each UE, $$\eta_i^1 = \frac{SBR_i^1}{N_{PRBused}^1(i,n)},$$

according to a service bit rate of each UE, $SBR^1_i$, when obtaining the channel information of each UE over the period of time.

14. The device according to claim 13, wherein the processor is further configured to determine an uplink load threshold over a future next period of time nT~(n+1)T, $P^1_{th}(n+1)$, in the equation of:

$$P_{th}^1(n+1) = \frac{\sum_{i=1}^{M} \frac{1}{\eta_i^1} \times DATA_i^1(n)}{N_{PRBtotal}}$$

when determining the threshold of resource utilization ratio according to the amount of additional data to be transmitted and the channel information of each UE over the period of time, wherein $N_{PRBtotal}$ is the total number of PRBs of all the subframes for uplink transmission of a PUSCH over the future next period of time nT~(n+1)T, $DATA^1_i(n)$ is a service transmission demand of the amount of additional data to be transmitted in the UE over the future next period of time nT~(n+1)T, $\eta^1_i$, is the spectrum efficiency of each UE, and M is the total number of UEs, wherein the processor is further configured to further determine the uplink load threshold over the future next period of time nT~(n+1)T, $P^i_{th}(n+1)$, in the equation of:

$$P_{th}^1(n+1) = MAX\left\{ P_{th\_min}, \frac{\sum_{i=1}^{M} \frac{1}{\eta_i^1} \times DATA_i^1(n)}{N_{PRBtotal}} \right\},$$

wherein $P_{th\_min}$ is a lower limit of the threshold of resource utilization ratio.

15. The device according to claim 11, wherein the processor is further configured to set the length of the period of time depending on a period in which a statistic of a service load level in interference coordination is made when determining the service load of the link over the period of time,
wherein the processor is further configured to set an uplink static period to be consistent with or equivalent to an update period of HII and a downlink static period to be consistent with or equivalent to an update period of RNTP if a selected inter-cell interference coordination technology is semi-static ICIC when making the statistic of the period of the service load level.

16. A method for processing inter-cell interference, comprising the steps of:
performing an inter-subframe service load balancing process according to claim 10; and
performing an interference alleviation process in one or a combination of the frequency domain, power and the space domain in combination with various inter-cell interference coordination technologies.

17. The method according to claim 16, wherein the interference coordination technologies comprise one or a combination of the following technologies:
Soft Frequency Reuse, SFR, Fractional Frequency Reuse, FFR, static/semi-static/dynamic ICIC, static/semi-static/dynamic beam coordination and multi-cell coordinated scheduling.

18. The method according to claim 16, further comprising:
performing a selection strategy in each resource dimension by a scheduler resulting from one or a combination of a resource selection priority weight output from the interference coordination technologies, channel information in respective physical resource blocks and a threshold of resource utilization ratio of inter-subframe load balancing.

19. The method according to claim 4, wherein the length of the period of time is set depending on a period in which a statistic of a service load level in interference coordination is made when the service load of the link over the period of time is determined,
wherein an uplink static period is set to be consistent with or equivalent to an update period of High Interference Indicator, HII, and a downlink static period is set to be consistent with or equivalent to an update period of Relative-narrowband Tx Power indicator, RNTP, if a selected inter-cell interference coordination technology is semi-static Inter-Cell Interference Coordination, ICIC, when the statistic of the period of the service load level is made.

20. The device according to claim 13, wherein the processor is further configured to set the length of the period of time depending on a period in which a statistic of a service load level in interference coordination is made when determining the service load of the link over the period of time,
wherein the processor is further configured to set an uplink static period to be consistent with or equivalent to an update period of HII and a downlink static period to be consistent with or equivalent to an update period of RNTP if a selected inter-cell interference coordination technology is semi-static ICIC when making the statistic of the period of the service load level.

* * * * *